(12) United States Patent
Choi et al.

(10) Patent No.: US 12,237,508 B2
(45) Date of Patent: Feb. 25, 2025

(54) NEGATIVE ELECTRODE ACTIVE MATERIAL FOR SECONDARY BATTERY, METHOD OF PRODUCING THE SAME, AND NEGATIVE ELECTRODE FOR SECONDARY BATTERY AND LITHIUM SECONDARY BATTERY INCLUDING THE SAME

(71) Applicant: LG ENERGY SOLUTION, LTD., Seoul (KR)

(72) Inventors: Hee Won Choi, Daejeon (KR); Je Young Kim, Daejeon (KR); Sang Wook Woo, Daejeon (KR); Li Lin Piao, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 896 days.

(21) Appl. No.: 17/292,200

(22) PCT Filed: Jan. 16, 2020

(86) PCT No.: PCT/KR2020/000833
§ 371 (c)(1),
(2) Date: May 7, 2021

(87) PCT Pub. No.: WO2020/149683
PCT Pub. Date: Jul. 23, 2020

(65) Prior Publication Data
US 2021/0328220 A1   Oct. 21, 2021

(30) Foreign Application Priority Data

Jan. 18, 2019   (KR) .................. 10-2019-0006527

(51) Int. Cl.
*H01M 4/583*   (2010.01)
*H01M 4/04*    (2006.01)
*H01M 10/0525* (2010.01)
*H01M 4/02*    (2006.01)

(52) U.S. Cl.
CPC ......... *H01M 4/583* (2013.01); *H01M 4/0471* (2013.01); *H01M 10/0525* (2013.01); *H01M 2004/021* (2013.01); *H01M 2004/027* (2013.01)

(58) Field of Classification Search
CPC ............. H01M 4/583; H01M 4/0471; H01M 10/0525; H01M 2004/021; H01M 2004/027; H01M 4/133; H01M 4/1393; H01M 4/625; H01M 4/366; H01M 4/587; C01P 2004/61; C01P 2004/84; C01P 2006/14; C01P 2004/80; C01P 2006/40; Y02E 60/10; C01B 32/05; C01B 32/21

See application file for complete search history.

(56) References Cited

U.S. PATENT DOCUMENTS

| | | | |
|---|---|---|---|
| 2008/0274406 A1 | 11/2008 | Fuse et al. | |
| 2011/0262802 A1 | 10/2011 | Uono et al. | |
| 2012/0288768 A1* | 11/2012 | Lee | H01M 4/587 252/182.1 |
| 2013/0122369 A1 | 5/2013 | Kim et al. | |
| 2014/0356707 A1 | 12/2014 | Kwon et al. | |
| 2015/0255793 A1* | 9/2015 | Wakizaka | C01B 32/21 252/182.1 |
| 2015/0270535 A1 | 9/2015 | Takeuchi et al. | |
| 2016/0276657 A1* | 9/2016 | Song | H01M 4/366 |
| 2018/0190985 A1 | 7/2018 | Choi et al. | |
| 2018/0212238 A1 | 7/2018 | Lee et al. | |
| 2019/0305308 A1 | 10/2019 | Lee et al. | |
| 2019/0334173 A1* | 10/2019 | Ikado | H01M 4/625 |
| 2020/0127288 A1* | 4/2020 | Lu | H01M 4/583 |

FOREIGN PATENT DOCUMENTS

| | | | | |
|---|---|---|---|---|
| CN | 101286556 A | * | 10/2008 | ............. Y02E 60/10 |
| CN | 103151497 A | * | 6/2013 | ............. Y02E 60/10 |
| CN | 103477476 A | | 12/2013 | |
| CN | 104300148 A | | 1/2015 | |
| CN | 106450163 A | | 2/2017 | |
| EP | 2 913 299 A1 | | 9/2015 | |
| EP | 3 297 073 A1 | | 3/2018 | |
| JP | 4403327 B2 | | 1/2010 | |
| JP | 5440099 B2 | | 3/2014 | |
| JP | 5567232 B1 | | 8/2014 | |
| JP | 2014-170724 A | | 9/2014 | |
| JP | 2014-232728 A | | 12/2014 | |
| JP | 2016-53291 A | | 3/2015 | |
| JP | 2018-186913 A | | 10/2016 | |
| JP | 2019033074 A | * | 2/2019 | ............. Y02E 60/10 |
| KR | 19990074979 A | * | 10/1999 | ............. C01B 32/05 |
| KR | 10-2007-0026786 A | | 3/2007 | |
| KR | 10-2014-0006967 A | | 1/2014 | |
| KR | 10-2014-0085767 A | | 7/2014 | |
| KR | 10-1419792 B1 | | 7/2014 | |
| KR | 10-2014-0140323 A | | 12/2014 | |
| KR | 10-2014-0141862 A | | 12/2014 | |
| KR | 10-2016-0078752 A | | 7/2016 | |
| KR | 10-2017-0016710 A | | 2/2017 | |
| KR | 10-1702980 B1 | | 2/2017 | |
| KR | 10-2017-0131268 A | | 11/2017 | |
| KR | 10-2018-0035693 A | | 4/2018 | |

OTHER PUBLICATIONS

International Search Report issued in PCT/KR2020/000833 (PCT/ISA/210), dated Apr. 24, 2020.
Extended European Search Report for European Application No. 20741282.6, dated Jan. 25, 2022.
Wang et al., "Characterization of Carbon-Coated Natural Graphite as a Lithium-Ion Battery Anode Material," Journal of The Electrochemical Society, vol. 149, No. 4, 2002, pp. A499-A503, 6 pages total.

* cited by examiner

*Primary Examiner* — Kaity V Chandler
(74) *Attorney, Agent, or Firm* — Birch, Stewart, Kolasch & Birch, LLP

(57) ABSTRACT

A negative electrode active material for a secondary battery including: natural graphite particles; and a carbon coating layer on a surface and in an inside of the natural graphite particles. The negative electrode active material for a secondary battery has a porosity of 3% to 13%.

7 Claims, No Drawings

NEGATIVE ELECTRODE ACTIVE MATERIAL FOR SECONDARY BATTERY, METHOD OF PRODUCING THE SAME, AND NEGATIVE ELECTRODE FOR SECONDARY BATTERY AND LITHIUM SECONDARY BATTERY INCLUDING THE SAME

CROSS-REFERENCE TO RELATED APPLICATION

This application is based on and claims the benefit of priority to Korean Patent Application No. 10-2019-0006527, filed on Jan. 18, 2019 in the Korean Intellectual Property Office, the disclosure of which is incorporated herein in its entirety by reference.

TECHNICAL FIELD

The present invention relates to a negative electrode active material for a secondary battery, a method of producing the same, and a negative electrode for a secondary battery and a lithium secondary battery including the same.

BACKGROUND ART

As the price of energy sources rises due to exhaustion of fossil fuel and a concern for environmental pollution is greatly increased, an environmentally friendly alternative energy source becomes an essential factor for future life.

In particular, as technology development and a demand for a mobile device are increased, the demand for a secondary battery as an environmentally friendly alternative energy source is rapidly increased.

In the secondary battery, a lithium metal was originally used as a negative electrode, but as battery short circuit due to formation of dendrite and an explosion risk therefrom became problematic, use of a carbon-based active material which allows intercalation and deintercalation of lithium ions and maintains structural and electrical properties has come up.

As the carbon-based active material, carbon-based materials in various forms such as artificial graphite, natural graphite, and hard carbon have been applied, and among these, a graphite-based active material which may guarantee life characteristics of a lithium secondary battery due to excellent reversibility is most widely used. Since the graphite-based active material has a low discharge voltage relative to lithium of −0.2 V, a battery using the graphite-based active material may represent a high discharge voltage of 3.6 V, and thus, provides many advantages in terms of an energy density of a lithium battery.

Among these, particularly natural graphite represents high output and capacity characteristics relative to other carbon-based active materials, but due to its high porosity and low mechanical strength, a side reaction with an electrolyte solution becomes strong and the life characteristic may be deteriorated.

Accordingly, there is currently needed development of natural graphite having excellent life performance together with high output performance.

Japanese Patent Registration No. 4403327 discloses a graphite powder for a negative electrode for a lithium ion secondary battery, but an alternative to the above problems has not been suggested.

RELATED ART DOCUMENT

Patent Document

Japanese Patent Registration No. 4403327

DISCLOSURE OF INVENTION

Technical Problem

An aspect of the present invention provides a negative electrode active material for a secondary battery having an excellent output characteristic and an excellent life characteristic.

Another aspect of the present invention provides a method of producing a negative electrode active material for a secondary battery having excellent output characteristics and excellent life characteristics.

Still another aspect of the present invention provides a negative electrode for a secondary battery and a secondary battery including the negative electrode active material for a secondary battery described above.

Technical Solution

According to an exemplary embodiment of the present invention, a negative electrode active material for a secondary battery includes natural graphite particles; and a carbon coating layer on a surface of the natural graphite particles and in an inside of the natural graphite particles, wherein the negative electrode active material for a secondary battery has a porosity of 3% to 13%.

According to another exemplary embodiment of the present invention, a method of producing a negative electrode active material for a secondary battery includes: subjecting natural graphite to a first baking treatment at 1,130° C. to 1,800° C.; mixing the first baking-treated natural graphite and a liquid pitch to form a carbon coating layer which coats a surface and an inside of the natural graphite; and subjecting the natural graphite having the carbon coating layer formed on the surface and in the inside thereof to a second baking treatment.

According to another exemplary embodiment of the present invention, a negative electrode for a secondary battery includes the negative electrode active material for a secondary battery described above.

According to still another exemplary embodiment of the present invention, a lithium secondary battery includes: the negative electrode for a secondary battery described above; a positive electrode facing the negative electrode for a secondary battery; a separator interposed between the negative electrode for a secondary battery and the positive electrode; and an electrolyte.

Advantageous Effects

The negative electrode active material for a secondary battery of the present invention includes natural graphite and a carbon coating layer which coats a surface and an inside of the natural graphite, and has a low porosity in a specific range. Accordingly, a negative electrode for a secondary battery and a secondary battery including the negative electrode active material for a secondary battery of the present invention may prevent a side reaction with an electrolyte solution to a significant level, and simultaneously, represent high output characteristics.

In addition, according to the method of producing a negative electrode active material for a secondary battery of the present invention, the natural graphite subjected to the first baking treatment in a specific temperature range is used as a core, and thus, crystallinity of the natural graphite is increased to an appropriate level, thereby improving both output and life characteristics of the natural graphite. In addition, since the carbon coating layer formed on the surface and in the inside of the natural graphite uses a liquid pitch as a raw material, a coating raw material may be permeated into pores inside as well as the surface of the natural graphite, and thus, the surface of and the pores inside the natural graphite may be decreased to an appropriate level to significantly decrease a swelling phenomenon. In addition, the carbon coating layer formed on the surface and in the inside of the natural graphite may improve mechanical durability of the natural graphite. Accordingly, the negative electrode active material for a secondary battery produced by the production method described above may have both improved high output characteristics and life characteristics.

BEST MODE FOR CARRYING OUT THE INVENTION

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

Terms used in the present specification are used only in order to describe exemplary embodiments rather than limiting the present invention. Singular forms are intended to include plural forms unless otherwise indicated contextually.

It should be understood that the terms "comprises", "provide", or "have" used in this specification, specify the presence of practiced features, numerals, steps, constitutional elements, or a combination thereof, but do not preclude the presence or addition possibility of one or more other features, numerals, steps, constitutional elements, or a combination thereof.

In the present specification, an average particle diameter ($D_{50}$) may be defined as a particle diameter corresponding to a cumulative volume of 50% in a particle size distribution curve of particles. The average particle diameter ($D_{50}$) may be measured using, for example, a laser diffraction method. By the laser diffraction method, generally a particle diameter approximately from a submicron range to several millimeters may be measured, and results of high reproducibility and high resolution may be obtained.

Hereinafter, the present invention will be described in detail.

<Method of Producing Negative Electrode Active Material for Secondary Battery>

The present invention relates to a method of producing a negative electrode active material for a secondary battery, and particularly to a method of producing a negative electrode active material for a lithium secondary battery.

The method of producing a negative electrode active material for a secondary battery of the present invention includes: subjecting natural graphite to a first baking treatment at 1,130° C. to 1,800° C.; mixing the first baking-treated natural graphite and a liquid pitch to form a carbon coating layer which coats a surface and an inside of the natural graphite; and subjecting the natural graphite having the carbon coating layer formed on the surface and in the inside thereof to a second baking treatment.

According to the method of producing a negative electrode active material for a secondary battery of the present invention, the natural graphite subjected to the first baking treatment in a specific temperature range is used as a core, and thus, crystallinity of the natural graphite may be increased to an appropriate level so that both output and life characteristics of the natural graphite are improved. In addition, since the carbon coating layer formed on the surface and in the inside of the natural graphite uses a liquid pitch as a raw material, a coating raw material may be permeated into pores inside as well as the surface of the natural graphite, and thus, the surface of and the pores inside the natural graphite may be decreased to an excellent level and significantly decrease a swelling phenomenon. In addition, the carbon coating layer formed on the surface and in the inside of the natural graphite may improve mechanical durability of the natural graphite. Accordingly, the negative electrode active material for a secondary battery produced by the production method described above may have both improved high output characteristics and life characteristics.

The method of producing a negative electrode active material for a secondary battery of the present invention includes subjecting natural graphite to a first baking treatment at 1,130° C. to 1,800° C.

According to the method of producing a negative electrode active material for a secondary battery of the present invention, the natural graphite is subjected to the first baking treatment at 1,130° C. to 1,800° C. before forming the carbon coating layer, so that the crystallinity of the natural graphite is increased to an appropriate level, the number of functional groups on the surface is decreased, and a specific surface area may be decreased. Accordingly, in the first baking treatment in the above temperature range, a side reaction with an electrolyte solution and a swelling phenomenon are prevented without hindering excellent output characteristics of the natural graphite, thereby representing long life characteristics.

When the natural graphite is subjected to the first baking treatment at a temperature lower than 1,130° C., the crystallinity of the natural graphite may not be sufficiently improved and decrease levels of the number of functional groups on the surface and the specific surface area are low, so that the reaction with an electrolyte solution may not be sufficiently prevented. When the natural graphite is subjected to the first baking treatment at a temperature higher than 1,800° C., the porosity of the natural graphite is excessively low, so that it is difficult to secure a lithium diffusion path, whereby the output characteristics may be excessively deteriorated.

Specifically, the temperature during the first baking treatment may be preferably 1,200° C. to 1,600° C., and more preferably 1,270° C. to 1,550° C., and in this case, the crystallinity and specific surface area of the natural graphite described above may be adjusted to a level satisfying the effects described above, and hindrance of the output characteristics due to excessive improvement of the crystallinity of the natural graphite may be prevented, which is thus more preferred.

The specific surface area of the natural graphite after being first baking-treated at 1,130° C. to 1,800° C. may be 8.4 m$^2$/g or less, preferably 3 m$^2$/g to 8.4 m$^2$/g, and more preferably 4 m$^2$/g to 7.4 m$^2$/g, in terms of preventing a side reaction with an electrolyte solution and occurrence of a swelling phenomenon. The "specific surface area" is measured by a BET method, and specifically, may be calculated from a nitrogen gas adsorption amount at a liquid nitrogen temperature (77 K), using BELSORP-mino II available from BEL Japan.

An average particle diameter ($D_{50}$) of the natural graphite may be 8 μm to 18 μm, preferably 10 μm to 15 μm, and when a negative electrode active material having the average particle diameter in such range is used in a negative electrode, packing may be performed to an excellent level and the reaction area with an electrolyte solution may be decreased, and thus, the effect of preventing a side reaction with an electrolyte solution may be maximized.

The first baking treatment may be performed under an oxygen atmosphere in terms of smoothly decreasing the specific surface area of the natural graphite.

The first baking treatment may be performed for 5 hours to 12 hours, preferably 6 hours to 8 hours, considering improvement of the crystallinity of the natural graphite, a decrease in the specific surface area, and the like.

The method of producing a negative electrode active material for a secondary battery of the present invention includes mixing the first baking-treated natural graphite and a liquid pitch to form a carbon coating layer which coats a surface and an inside of the natural graphite.

According to the method of producing a negative electrode active material for a secondary battery of the present invention, the first baking-treated natural graphite is coated with the liquid pitch to form the carbon coating layer, and since the liquid pitch is used as a coating raw material, pores may be sufficiently filled from the surface to the inside of the natural graphite, as compared with the case of using a solid pitch. In addition, as the carbon coating layer is formed, surface functional groups of the natural graphite may be further decreased. Accordingly, since the porosity of the natural graphite may be decreased to an appropriate level, effects of preventing a side reaction with an electrolyte solution and preventing a swelling phenomenon may be improved, without deteriorating output characteristics of the natural graphite, simultaneously.

In addition, since the carbon coating layer is formed on the surface and in the inside of the natural graphite, entire mechanical durability of the negative electrode active material may be improved, which is preferred for improving life characteristics.

The liquid pitch may be a mixture of a pitch and a solvent.

As the pitch, a coal-based pitch and/or a petroleum-based pitch may be used without limitation, and preferably, a petroleum-based pitch may be used in terms of excellent cycle stability.

As the solvent, a solvent such as tetrahydrofuran (THF), benzene, toluene, and/or quinoline, which may dissolve the pitch in a wide range may be used.

The liquid pitch may be a mixture of the pitch and the solvent at a weight ratio of 50:50 to 95:5, preferably 65:35 to 85:15, considering a viscosity of the liquid and a solubility of the pitch.

A mixed amount of the liquid pitch may be properly designed entirely considering the pores and the porosity of the natural graphite, and for example, the natural graphite and the liquid pitch may be mixed at a weight ratio of 85:15 to 99:1, preferably 90:10 to 97:3.

The carbon coating layer may be present in an amount of 3.5 wt % to 5.5 wt %, preferably 4 wt % to 5 wt %, based on a total weight of the negative electrode active material for a secondary battery, and within the range, the mechanical durability of the negative electrode active material may be improved while the output characteristics of the negative electrode active material are not hindered, which is thus preferred.

As the natural graphite and the liquid pitch are mixed, the carbon coating layer may be formed on the surface and in the inside of the natural graphite.

The method of producing a negative electrode active material for a secondary battery of the present invention includes subjecting the natural graphite particles having the carbon coating layer on the surface and in the inside of the natural graphite particles to a second baking treatment.

By the second baking treatment, graphitization of the negative electrode active material including the natural graphite and the carbon coating layer may be performed.

The second baking treatment may be performed under an oxygen atmosphere in terms of increasing the crystallinity of the negative electrode active material.

The second baking treatment may be performed at a temperature of 2,800° C. to 3,000° C., preferably 2,860° C. to 2,940° C., in terms of smoothly performing graphitization and increasing the crystallinity of the negative electrode active material.

The second baking treatment may be performed for 3 hours to 12 hours, preferably 4 hours to 8 hours, in terms of sufficiently performing graphitization.

By the second baking treatment, the negative electrode active material for a secondary battery including the carbon coating layer formed on the surface and in the inside of the natural graphite particles may be prepared.

The negative electrode active material for a secondary battery produced by the above production method may have a porosity in a low level of 3% to 13%, preferably 3% to 10%, more preferably 3% to 8%, and still more preferably 3% to 6%, and thus, the excellent output and capacity characteristics of the natural graphite may be implemented while excellent durability and prevention of the side reaction with an electrolyte solution may be implemented, which is preferred for life characteristics.

<Negative Electrode Active Material for Secondary Battery>

In addition, the present invention provides a negative electrode active material for a secondary battery, specifically a negative electrode active material for a lithium secondary battery. Specifically, the negative electrode active material for a secondary battery may be the negative electrode active material for a secondary battery produced from the method of producing a negative electrode active material for a secondary battery described above.

Specifically, the negative electrode active material for a secondary battery of the present invention includes natural graphite particles; and a carbon coating layer formed on a surface and in an inside of the natural graphite particles, and has a porosity of 3% to 13%.

The negative electrode active material for a secondary battery of the present invention includes the carbon coating layer formed on the surface and in the inside of the natural graphite particles, has a porosity in a low level of 3% to 13%, and thus, excellent output and capacity characteristics of the natural graphite particles may be implemented while excellent durability and prevention of a side reaction with an electrolyte solution may be implemented, which is preferred for life characteristics.

The porosity may be calculated by measuring a BET specific surface area of an active material, plotting the BET specific surface area according to the Barrett-Joyner-Halenda (BJH) theory to measure a fine pore area, and putting the fine pore area into the following equation 1. As a BET specific surface area measuring device, BELSORP-mini II (product name, manufactured by BEL Japan) may be used.

$$\text{Porosity (\%)}=\text{fine pore area/BET specific surface area}\times 100 \quad \text{[equation 1]}$$

Specifically, the negative electrode active material for a secondary battery of the present invention may be implemented according to the method of producing a negative electrode active material for a secondary battery described above.

The negative electrode active material for a secondary battery of the present invention may have a porosity of 3% to 13%, preferably 3% to 10%, more preferably 3% to 8%, and still more preferably 3% to 6%. Within the range, both the output characteristics and the life characteristics of the negative electrode active material may be preferably improved. When the porosity of the negative electrode active material is more than 13%, the side reaction with an electrolyte solution and the swelling phenomenon may be worse, which is thus not preferred. In addition, when the porosity of the negative electrode active material is less than 3%, it is difficult to sufficiently secure a lithium diffusion path, and thus, the output characteristics may be excessively hindered.

The carbon coating layer may be included at 3.5 wt % to 5.5 wt %, preferably 4 wt % to 5 wt %, based on the total weight of the negative electrode active material for a secondary battery. Within the range, improvement of the mechanical durability and the life characteristics may be preferably implemented without hindering the output characteristics of the natural graphite particles.

Besides, the raw material, the type, the size, the content, the production method, and the like of the natural graphite particles and the carbon coating layer are as described above.

<Negative Electrode for Secondary Battery and Secondary Battery>

In addition, the present invention provides a negative electrode for a secondary battery and a secondary battery including the negative electrode active material for a secondary battery described above.

Specifically, the negative electrode for a secondary battery of the present invention includes: a negative electrode current collector; and a negative electrode active material layer formed on the negative electrode current collector, and the negative electrode active material layer includes the negative electrode active material for a secondary battery described above.

As the negative electrode current collector, a negative electrode current collector commonly used in the art may be used without limitation, and for example, there is no particular limitation as long as the negative electrode current collector has a high conductivity without causing a chemical change in the lithium secondary battery. For example, as the negative electrode current collector, copper, stainless steel, aluminum, nickel, titanium, baked carbon, copper or stainless steel which is surface treated with carbon, nickel, titanium, silver, and the like, an aluminum-cadmium alloy, and the like may be used.

The negative electrode current collector may have fine unevenness formed on the surface thereon to strengthen a binding force to the negative electrode active material, and may be used in various forms such as a film, a sheet, a foil, a net, a porous body, a foam, and a nonwoven fabric body.

The negative electrode current collector may generally have a thickness of 3 μm to 500 μm.

The negative electrode active material layer is formed on the negative electrode current collector and includes the negative electrode active material for a secondary battery described above.

The negative electrode active material layer may further include at least one or more additives selected from the group consisting of a binder, a thickener, and a conductive material, in addition to the negative electrode active material for a lithium secondary battery described above.

The binder is a component assisting binding of a conductive material, an active material, and a current collector, and may be included usually at 1 wt % to 30 wt %, based on the total weight of the negative electrode active material layer.

The binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, a styrene-butadiene rubber, a fluororubber, or a combination of two or more thereof.

As the thickener, all thickeners conventionally used in a lithium secondary battery may be used, and as an example, carboxymethylcellulose (CMC) and the like may be used.

The conductive material is a component for further improving the conductivity of the negative electrode active material, and may be included at 1 wt % to 30 wt %, based on the total weight of the negative electrode active material layer.

The conductive material is not particularly limited as long as it has conductivity without causing a chemical change in the battery, and for example, graphite such as natural graphite or artificial graphite; carbon black such as acetylene black, ketjen black, channel black, furnace black, lamp black, and thermal black; conductive fibers such as a carbon fiber or a metal fiber; fluorocarbon; metal powder such as aluminum, and nickel powder; conductive whiskers such as zinc oxide and potassium titanate; conductive metal oxides such as titanium oxide; conductive materials such as polyphenylene derivatives, and the like may be used. Specific examples of commercially available conductive materials include acetylene black series such as products from Chevron Chemical Company, Denka black from Denka Singapore Private Limited, and products from Gulf Oil Company, Ketjen black EC series from Armak Company, Vulcan XC-72 from Cabot Company, Super P from Timcal, and the like.

The negative electrode active material layer may be produced by mixing the negative electrode active material for a lithium secondary battery described above with at least one additive selected from the binder, the conductive material, and the thickener in a solvent to prepare a negative electrode slurry, and applying the negative electrode slurry on the negative electrode current collector and rolling and drying the applied slurry.

The solvent may include water or an organic solvent such as N-methyl-2-pyrrolidone (NMP), and may be used in an amount at which a solution including the negative electrode active material, and optionally the binder, the conductive material, and the like with the solvent has a preferred viscosity. For example, the solvent may be included in an amount at which a concentration of a solid content including the negative electrode active material for a secondary battery and optionally the binder, the thickener, and the conductive material is 50 wt % to 95 wt %, preferably 70 wt % to 90 wt %.

A total pore volume of the negative electrode for a lithium secondary battery may be 7.5 cm$^3$/g to 18.5 cm$^3$/g, preferably 7.5 cm$^3$/g to 15.5 cm$^3$/g, and more preferably 7.5 cm$^3$/g to 11 cm$^3$/g. Within the range, pores in a sufficient level at which the output characteristics are not hindered may be secured, while the side reaction with an electrolyte solution and the swelling phenomenon may be prevented, which is thus preferred. The total pore volume may be measured by a method of measuring a total pore volume according to the Barrett-Joyner-Halenda (BJH) theory, when measuring the specific surface area of the negative electrode for example, with a BET measurement equipment.

In addition, the present invention provides a secondary battery, specifically a lithium secondary battery including the negative electrode for a secondary battery described above.

Specifically, the secondary battery includes: the negative electrode for a secondary battery described above; a positive electrode facing the negative electrode for a secondary battery; a separator interposed between the negative electrode for a secondary battery and the positive electrode; and an electrolyte.

It may be produced by coating a positive electrode active material slurry including a positive electrode active material, and optionally, a binder, a conductive material, solvent, and the like on a positive electrode current collector, and drying and rolling the slurry.

The positive electrode current collector is not particularly limited as long as it has a conductivity without causing a chemical change in the battery, and for example, stainless steel, aluminum, nickel, titanium, baked carbon, or aluminum or stainless steel which is surface-treated with carbon, nickel, titanium, silver, or the like may be used.

The positive electrode active material is a compound capable of reversible intercalation and deintercalation of lithium, and may specifically include a lithium composite metal oxide including one or more metals such as cobalt, manganese, nickel, or aluminum with lithium. More specifically, examples of the lithium composite metal oxide may include lithium-manganese-based oxides (for example, $LiMnO_2$, $LiMn_2O_4$, and the like), lithium-cobalt-based oxides (for example, $LiCoO_2$, and the like), lithium-nickel-based oxides (for example, $LiNiO_2$, and the like), lithium-nickel-manganese-based oxides (for example, $LiNi_{1-Y}M_{n_Y}O_2$ (wherein 0<Y<1), $LiMn_{2-z}Ni_zO_4$ (wherein 0<Z<2), and the like), lithium-nickel-cobalt-based oxides (for example, $LiNi_{1-Y1}Co_{Y1}O_2$ (wherein 0<Y1<1), and the like), lithium-manganese-cobalt-based oxides (for example, $LiCo_{1-Y2}Mn_{Y2}O_2$ (wherein 0<Y2<1), $LiMn_{2-z1}Co_{z1}O_4$ (wherein 0<Z1<2), and the like), lithium-nickel-manganese-cobalt-based oxides (for example, $Li(Ni_pCo_qMn_{r1})O_2$ (wherein 0<p<1, 0<q<1, 0<r1<1, and p+q+r1=1) or $Li(Ni_{p1}Co_{q1}Mn_{r2})O_4$ (wherein 0<p1<2, 0<q1<2, 0<r2<2, and p1+q1+r2=2), and the like), or lithium-nickel-cobalt-transition metal (M) oxides (for example, $Li(Ni_{p2}Co_{q2}Mn_{r3}M_{s2})O_2$ (wherein M is selected from the group consisting of Al, Fe, V, Cr, Ti, Ta, Mg, and Mo; and p2, q2, r3, and s2 are atomic fractions of each independent element, and 0<p2<1, 0<q2<1, 0<r3<1, 0<s2<1, p2+q2+r3+s2=1), and the like), and the like, and any one or two or more compounds thereof may be included. Among these, in terms of increasing the capacity characteristics and the safety of the battery, the lithium composite metal oxide may be $LiCoO_2$, $LiMnO_2$, $LiNiO_2$, a lithium nickel manganese cobalt oxide (for example, $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, or the like), a lithium nickel cobalt aluminum oxide (for example, $Li(Ni_{0.8}Co_{0.15}Al_{0.05})O_2$, or the like) or the like, and considering the kind of the constituent elements forming the lithium composite metal oxide and the remarkableness of an improvement effect due to content ratio control, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and any one or a mixture of two or more thereof may be used.

The positive electrode active material may be included at 80 wt % to 99 wt %, based on the total weight of each positive electrode mixed agent.

The binder is a component assisting a binding of the active material, the conductive material, and the like and a binding with the current collector, and is usually added at 1 to 30 wt %, based on the total weight of the positive electrode mixed agent. Examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated-EPDM, a styrene-butadiene rubber, a fluororubber, various copolymers, and the like.

The conductive material may be usually added at 1 to 30 wt %, based on the total weight of the positive electrode mixed agent.

The conductive material is not particularly limited as long as it has conductivity without causing a chemical change in the battery, and for example, graphite; carbon-based materials such as carbon black, acetylene black, ketjen black, channel black, furnace black, lamp black, and thermal black; conductive fibers such as a carbon fiber or a metal fiber; fluorocarbon; metal powder such as aluminum, and nickel powder; conductive whiskers such as zinc oxide and potassium titanate; conductive metal oxides such as titanium oxide; conductive materials such as polyphenylene derivatives, and the like may be used. Specific examples of commercially available conductive materials include acetylene black series such as products from Chevron Chemical Company, Denka black from Denka Singapore Private Limited, and products from Gulf Oil Company, Ketjen black EC series from Armak Company, Vulcan XC-72 from Cabot Company, Super P from Timcal, and the like.

The solvent may include an organic solvent such as N-methyl-2-pyrrolidone (NMP), and may be used in an amount at which a solution including the positive electrode active material, and optionally the binder, the conductive material, and the like with the solvent has a preferred viscosity. For example, the solvent may be included in an amount at which a concentration of a solid content including the positive electrode active material, and optionally the binder and the conductive material is 50 wt % to 95 wt %, preferably 70 wt % to 90 wt %.

In the lithium secondary battery, the separator separates the negative electrode and the positive electrode and provides a transport passage of lithium ions, and any separator may be used without particular limitation as long as it is usually used as a separator in a lithium secondary battery. In particular, a separator having a low resistance to ion transport of an electrolyte and excellent electrolyte solution impregnation ability, is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more films thereof, may be used. In addition, a common porous nonwoven fabric, for example, a nonwoven fabric made of a glass fiber having a high melting point, a polyethylene terephthalate fiber and the like may be used. In addition, a coated separator containing a ceramic component or a polymer material for securing thermal resistance or mechanical strength may be used, optionally as a monolayer or multilayer structure.

In addition, examples of the electrolyte used in the present invention include organic-based liquid electrolytes, inorganic-based liquid electrolyte, solid polymer electrolytes, gel type polymer electrolytes, solid inorganic electrolytes, molten type inorganic electrolytes, and the like, which may be used in the production of the secondary battery, but are not limited thereto.

Specifically, the electrolyte may include an organic solvent and a lithium salt.

As the organic solvent, any organic solvent may be used without particular limitation as long as it may serve as a medium in which ions involved in the electrochemical reaction of a battery may move. Specifically, as the organic solvent, ester-based solvents such as methyl acetate, ethyl acetate, γ-butyrolactone, and ε-caprolactone; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), ethyl methyl carbonate (EMC), ethylene carbonate (EC), and propylene carbonate (PC); alcohol-based solvents such as ethyl alcohol and isopropyl alcohol; nitriles such as R—CN (R is a C2 to C20 linear, branched, or cyclic hydrocarbon group, and may include a double bond aromatic ring or an ether bond); amides such as dimethylformamide; dioxolane such as 1,3-dioxolane; or sulfolanes, and the like may be used. Among these, a carbonate-based solvent is preferred, and a mixture of cyclic carbonate having a high ion conductivity and a high dielectric constant to increase charge/discharge performance of a battery (for example, ethylene carbonate, propylene carbonate, or the like) and a linear carbonate-based compound having a low viscosity (for example, ethyl methyl carbonate, dimethyl carbonate, diethyl carbonate, or the like) is more preferred. In this case, when the cyclic carbonate and the chain carbonate are mixed at a volume ratio of about 1:1 to about 1:9 and used, electrolyte solution performance may be excellent.

The lithium salt may be used without particular limitation as long as it is a compound capable of providing a lithium ion used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. It is preferred that a concentration of the lithium salt is in a range of 0.1 M to 2.0 M. When the lithium salt concentration is within the range, the electrolyte has appropriate conductivity and viscosity, so that the electrolyte may exhibit excellent electrolyte performance and lithium ions may effectively move.

As described above, the secondary battery according to the present invention is useful in portable devices such as a mobile phone, a notebook computer, and a digital camera, electric vehicle fields such as a hybrid electric vehicle (HEV), and the like, and in particular, may be preferably used as a configuration cell of a mid-large battery module. Accordingly, the present invention also provides a mid-large battery module including the secondary battery as described above as a unit cell.

The mid-large battery module may be preferably applied to a power source requiring a large output and a large capacity such as an electric vehicle, a hybrid electric vehicle, and an electric power storage apparatus.

Hereinafter, the Examples of the present invention will be described in detail so as to be easily practiced by a person with ordinary skill in the art to which the present invention pertains. However, the present invention may be implemented in various different forms and is not limited to the embodiments provided in the present description.

EXAMPLES

Example 1: Production of Negative Electrode Active Material for Secondary Battery Natural graphite particles having an average particle diameter ($D_{50}$) of 12 μm was prepared, and the natural graphite particles were subjected to a first baking treatment at 1,350° C. for 7 hours.

As a liquid pitch, a mixed solvent obtained by mixing a petroleum-based pitch and a THF solvent at a weight ratio of 80:20 at 2,000 rpm and stirring the mixture, was used. The first baking-treated natural graphite and the petroleum-based pitch of the liquid pitch were mixed so that the weight ratio was 95.5:4.5. Accordingly, a carbon coating layer was formed on a surface and in an inside of the natural graphite.

The natural graphite having the carbon coating layer formed on the surface and in the inside thereof was subjected to a second baking treatment at 2,900° C. for 6 hours to produce a negative electrode active material for a secondary battery of Example 1. The carbon coating layer was formed at 4.5 wt %, based on a total weight of the negative electrode active material for a secondary battery.

The negative electrode active material for a secondary battery of Example 1 had a porosity of 5%.

The porosity was calculated by measuring a BET specific surface area of the negative electrode active material, plotting the BET specific surface area according to the Barrett-Joyner-Halenda (BJH) theory to measure a fine pore area, and putting the fine pore area into the following Formula 1. As a BET specific surface area measuring device, BEL-SORP-mini II (product name, manufactured by BEL Japan) was used.

Porosity (%)=fine pore area/BET specific surface area×100     [Formula 1]

Example 2: Production of Negative Electrode Active Material for Secondary Battery A negative electrode active material for a secondary battery of Example 2 was produced in the same manner as in Example 1, except that a first baking treatment temperature was 1,250° C. The negative electrode active material for a secondary battery of Example 2 had a porosity of 7%.

Example 3: Production of Negative Electrode Active Material for Secondary Battery A negative electrode active material for a secondary battery of Example 3 was produced in the same manner as in Example 1, except that a first baking treatment temperature was 1,150° C.

The negative electrode active material for a secondary battery of Example 3 had a porosity of 9%.

Example 4: Production of Negative Electrode Active Material for Secondary Battery A negative electrode active material for a secondary battery of Example 4 was produced in the same manner as in Example 1, except that a first baking treatment temperature was 1,500° C.

The negative electrode active material for a secondary battery of Example 4 had a porosity of 4%.

Comparative Example 1

A negative electrode active material for a secondary battery of Comparative Example 1 was produced in the same manner as in Example 1, except that a first baking treatment temperature was 1,100° C.

The negative electrode active material for a secondary battery of Comparative Example 1 had a porosity of 18%.

Comparative Example 2

A negative electrode active material for a secondary battery of Comparative Example 2 was produced in the same manner as in Example 1, except that a solid pitch was used instead of the liquid pitch, the solid pitch was a petroleum-based pitch, and the first baking-treated natural graphite particles and the solid pitch were mixed at a weight ratio of 95.5:4.5.

The negative electrode active material for a secondary battery of Comparative Example 2 had a porosity of 26%.

Comparative Example 3

A negative electrode active material for a secondary battery of Comparative Example 3 was produced in the same manner as in Comparative Example 2, except that a first baking treatment temperature was 1,100° C.

The negative electrode active material for a secondary battery of Comparative Example 3 had a porosity of 28%.

Comparative Example 4

A negative electrode active material for a secondary battery of Comparative Example 4 was produced in the same manner as in Comparative Example 3, except that the first baking-treated natural graphite particles and the solid pitch were mixed at a weight ratio of 96.5:3.5, and a carbon coating layer was formed at 3.5 wt %, based on the total weight of the negative electrode active material for secondary battery.

The negative electrode active material for a secondary battery of Comparative Example 4 had a porosity of 32%.

Comparative Example 5

A negative electrode active material for a secondary battery of Comparative Example 5 was produced in the same manner as in Comparative Example 2, except that a first baking treatment temperature was 1,600° C.

The negative electrode active material for a secondary battery of Comparative Example 5 had a porosity of 22%.

Comparative Example 6

Artificial graphite having an average particle diameter ($D_{50}$) of 12 μm was prepared, and the artificial graphite was subjected to a first baking treatment at 1,400° C. The first baking-treated artificial graphite and a petroleum-based pitch (solid pitch) were mixed at a weight ratio of 95.5:4.5 at 2,000 rpm to form a carbon coating layer on the artificial graphite.

The artificial graphite having the carbon coating layer formed was subjected to a baking treatment at 2,900° C. for 6 hours to produce a negative electrode active material for a secondary battery of Comparative Example 6. The carbon coating layer was formed at 4.5 wt %, based on the total weight of the negative electrode active material for a secondary battery.

The negative electrode active material for a secondary battery of Comparative Example 6 had a porosity of 19%.

Comparative Example 7

A negative electrode active material for a secondary battery of Comparative Example 7 was produced in the same manner as in Comparative Example 6, except that a first baking treatment temperature was 1,450° C.

The negative electrode active material for a secondary battery of Comparative Example 7 had a porosity of 15%.

Comparative Example 8

A negative electrode active material of Comparative Example 8 was produced in the same manner as in Example 1, except that artificial graphite having an average particle diameter ($D_{50}$) of 12 μm was used instead of the natural graphite particles.

The negative electrode active material for a secondary battery of Comparative Example 8 had a porosity of 17%.

Comparative Example 9

A negative electrode active material for a secondary battery of Comparative Example 9 was produced in the same manner as in Example 1, except that a first baking treatment temperature was 2,000° C.

The negative electrode active material for a secondary battery of Comparative Example 9 had a porosity of 2%.

<Production of Negative Electrode for Secondary Battery>

The negative electrode active materials for a secondary battery produced Examples 1 to 4 and Comparative Examples 1 to 9, Super C65 as a conductive material, a styrene butadiene rubber (SBR) as a binder, and carboxymethyl cellulose (CMC) as a thickener were mixed at a weight ratio of 96.6:1:1.3:1.1, and water was added thereto to prepare a negative electrode slurry.

The negative electrode slurry prepared above was applied to a copper current collector, and dried under vacuum at 130° C. for 10 hours to produce negative electrodes for a secondary battery of Example 1 to 4 and Comparative Examples 1 to 9. Here, a loading of the negative electrode was 3.61 mAh/cm².

Total pore volumes of the negative electrodes for a secondary battery of the Examples and the Comparative Examples produced above were measured. The total pore volume of the negative electrode for a secondary battery was measured using BET measuring equipment (equipment name: BEL Sorp., manufactured by BEL JAPAN) by a method of measuring the total pore volume according to the Barrett-Joyner-Halenda (BJH) theory when measuring the specific surface area of the negative electrode. The results are shown in the following Table 1.

<Production of Secondary Battery>

$LiNi_{0.6}Co_{0.2}Mn_{0.2}O_2$ as an active material, Li-435 (manufactured by Denka) as a conductive material, KF9700 (manufactured by Kureha) as a binder, and BM-730H (manufactured by Zeon) as a thickener were mixed at a weight ratio of 96.25:1.0:1.5:1.25, respectively, water was added thereto to prepare a positive electrode slurry, and then the positive electrode slurry was applied on an aluminum foil, which was dried under vacuum at about 130° C. for 8 hours and rolled to produce a positive electrode. Here, the positive electrode was produced so that a loading thereof was 3.61 mAh/cm².

A polyolefin separator was interposed between each of the negative electrodes produced in Examples 1 to 4 and Comparative Examples 1 to 9 and the positive electrode, and then an electrolyte solution in which 1 M $LiPF_6$ was dissolved in a nonaqueous electrolyte solvent of ethylene carbonate (EC) and ethyl methyl carbonate (EMC) mixed at a volume ratio of 1:4, was injected to produce each secondary battery of the Examples and the Comparative Examples.

TABLE 1

| | Core | | | Carbon coating layer | | | |
|---|---|---|---|---|---|---|---|
| | | | | Carbon coating | | | |
| | Core type | First baking treatment temperature (° C.) | Specific surface area of core after baking treatmet (m²/g) | Coating raw material | Carbon coating layer content (wt %) (based on total weight of negative electrode active material) | Porosity (%) | Negative electrode Total pore volume (cm³/g) |
| Example 1 | Natural graphite | 1,350 | 6 | Liquid pitch | 4.5 | 5 | 10 |
| Example 2 | Natural graphite | 1,250 | 7 | Liquid pitch | 4.5 | 7 | 12 |
| Example 3 | Natural graphite | 1,150 | 8 | Liquid pitch | 4.5 | 9 | 15 |
| Example 4 | Natural graphite | 1,500 | 5 | Liquid pitch | 4.5 | 4 | 8 |
| Comparative Example 1 | Natural graphite | 1,100 | 9 | Liquid pitch | 4.5 | 18 | 23 |
| Comparative Example 2 | Natural graphite | 1,350 | 15 | Solid pitch | 4.5 | 26 | 27 |
| Comparative Example 3 | Natural graphite | 1,100 | 17 | Solid pitch | 4.5 | 28 | 30 |
| Comparative Example 4 | Natural graphite | 1,100 | 16 | Solid pitch | 3.5 | 32 | 35 |
| Comparative Example 5 | Natural graphite | 1,600 | 12 | Solid pitch | 4.5 | 22 | 27 |
| Comparative Example 6 | Artificial graphite | 1,400 | 8 | Solid pitch | 4.5 | 19 | 18 |
| Comparative Example 7 | Artificial graphite | 1,450 | 6 | Solid pitch | 4.5 | 15 | 17 |
| Comparative Example 8 | Artificial graphite | 1,350 | 11 | Liquid pitch | 4 | 17 | 19 |
| Comparative Example 9 | Natural graphite | 2,000 | 4 | Liquid pitch | 4.5 | 2 | 7 |

Experimental Example 1: Evaluation of Swelling

The secondary batteries of Examples 1 to 4 and Comparative Examples 1 to 9 produced above were charged and discharged in a charge ranges SOC 0 to SOC 95, with a first cycle of 0.1 C, a second cycle of 0.2 C, and a third cycle to a 30th cycle of 0.5 C. Thereafter, a swell ratio was measured by the following Equation 1:

$$\text{Swelling ratio (\%)} = (d_2 - d_1)/d_1 \times 100 \quad \text{[Equation 1]}$$

wherein $d_1$ is a thickness of a negative electrode for a secondary battery before performing a first charge/discharge cycle, and $d_2$ is a thickness of a negative electrode for a secondary battery after performing a 30th charge/discharge cycle.

TABLE 2

| | Swelling ratio (%) |
|---|---|
| Example 1 | 18.4 |
| Example 2 | 19.3 |
| Example 3 | 20.2 |
| Example 4 | 18.1 |
| Comparative Example 1 | 28.9 |
| Comparative Example 2 | 30.5 |
| Comparative Example 3 | 31.6 |
| Comparative Example 4 | 33.8 |
| Comparative Example 5 | 28.5 |
| Comparative Example 6 | 27.3 |
| Comparative Example 7 | 25.6 |
| Comparative Example 8 | 25.4 |
| Comparative Example 9 | 18.1 |

Referring to Table 2, it was confirmed that in the negative electrode active materials for a secondary battery of Examples 1 to 4 produced by mixing the first baking-treated natural graphite particles at a temperature of 1,130° C. to 1,800° C. and the liquid pitch to form the carbon coating layer which coated the surface and the inside of the natural graphite, and performing the second baking treatment, the side reaction with an electrolyte solution was significantly prevented and the swelling phenomenon was decreased, as compared with the Comparative Examples.

Experimental Example 2: Evaluation of Output

Output characteristics of the secondary batteries of Examples 1 to 4 and Comparative Examples 1 to 9 produced above were evaluated. The output characteristics were evaluated by setting the secondary batteries of the Examples and the Comparative Examples at SOC 50 according to a hybrid pulse power characterization (HPPC) test, and measuring an output resistance at room temperature (25° C.)

Specifically, the secondary batteries were charged and discharged for three cycles in a condition of discharging at 2.5 V and charging at 4.2 V at 0.33 C. Thereafter, the batteries were charged to 2.5 C (10 minutes), stopped (30 minutes), discharged to 2.5 C (10 minutes), and stopped (30 minutes), from the state of being discharged to SOC 50, and a voltage change during charging/discharging was divided by the applied current to measure the output resistance.

TABLE 3

| | Output resistance (Ohm) |
|---|---|
| Example 1 | 0.71 |
| Example 2 | 0.75 |
| Example 3 | 0.80 |
| Example 4 | 0.72 |
| Comparative Example 1 | 0.94 |
| Comparative Example 2 | 1.01 |
| Comparative Example 3 | 1.05 |
| Comparative Example 4 | 1.12 |
| Comparative Example 5 | 1.26 |
| Comparative Example 6 | 1.41 |
| Comparative Example 7 | 1.79 |
| Comparative Example 8 | 1.77 |
| Comparative Example 9 | 1.54 |

Referring to Table 3, it was confirmed that the negative electrode active materials for a secondary battery of Examples 1 to 4 produced by mixing the first baking-treated natural graphite particles at a temperature of 1,130° C. to 1,800° C. and the liquid pitch to form the carbon coating layer which coated the surface and the inside of the natural graphite, and performing the second baking treatment, also showed excellent performance in the output characteristics, as compared with the Comparative Examples.

The invention claimed is:

1. A method of producing the negative electrode active material for a secondary battery, the method comprising:
    subjecting natural graphite particles to a first baking treatment at a temperature of 1,130° C. to 1,800° C.;
    mixing the first baking-treated natural graphite particles and a liquid pitch to form a carbon coating layer, wherein the carbon coating layer coats a surface and an inside of the natural graphite; and
    subjecting the natural graphite particles having the carbon coating layer formed on the surface and in the inside of the natural graphite particles to a second baking treatment.

2. The method of producing the negative electrode active material for the secondary battery according to claim 1, wherein the first baking treatment is performed at a temperature of 1,200° C. to 1,600° C.

3. The method of producing the negative electrode active material for the secondary battery according to claim 1, wherein the first baking treatment is performed for 5 hours to 12 hours.

4. The method of producing the negative electrode active material for the secondary battery according to claim 1, wherein the second baking treatment is performed at a temperature of 2,800° C. to 3,000° C.

5. The method of producing the negative electrode active material for the secondary battery according to claim 1, wherein the second baking treatment is performed for 3 hours to 12 hours.

6. The method of producing the negative electrode active material for the secondary battery according to claim 1, wherein the natural graphite particles have an average particle diameter ($D_{50}$) of 8 μm to 12 μm.

7. The method of producing the negative electrode active material for the secondary battery according to claim 1, wherein the carbon coating layer is present in an amount of 3.5 wt % to 5.5 wt %, based on a total weight of the negative electrode active material.

* * * * *